(12) United States Patent
Wright

(10) Patent No.: US 6,961,519 B2
(45) Date of Patent: *Nov. 1, 2005

(54) SELF-TIMERED DEVICE FOR ACTIVATING A CAMERA SHUTTER RELEASE MECHANISM

(75) Inventor: Douglas Wright, 628 Highway 75, Blountville, TN (US) 37617

(73) Assignee: Douglas Wright, Fort Madison, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/805,025

(22) Filed: Mar. 18, 2004

(65) Prior Publication Data

US 2004/0175168 A1  Sep. 9, 2004

Related U.S. Application Data

(63) Continuation of application No. 10/138,459, filed on May 3, 2002, now Pat. No. 6,816,675.
(60) Provisional application No. 60/288,563, filed on May 3, 2001.

(51) Int. Cl.[7] .............................................. G03B 17/38
(52) U.S. Cl. ...................... 396/264; 396/502; 396/544
(58) Field of Search ............................ 396/264, 502, 396/544

(56) References Cited

U.S. PATENT DOCUMENTS

| 1,333,918 | A | * | 3/1920 | Masaji | 396/474 |
|---|---|---|---|---|---|
| 2,769,380 | A | * | 11/1956 | Rapaport | 396/544 |
| 3,185,062 | A | | 5/1965 | Aurandt | |
| 3,357,332 | A | | 12/1967 | Helber et al. | |
| 3,831,184 | A | | 8/1974 | Morse | |
| 4,794,414 | A | | 12/1988 | Kozina et al. | |
| 5,611,324 | A | | 3/1997 | Kursinsky | |
| 5,881,320 | A | | 3/1999 | Balling | |

FOREIGN PATENT DOCUMENTS

| JP | 4254841 | | 9/1992 |
|---|---|---|---|
| JP | 5158146 | A | 6/1993 |
| JP | 8271975 | A | 10/1996 |

* cited by examiner

*Primary Examiner*—David M. Gray
(74) *Attorney, Agent, or Firm*—Dicke, Billig & Czaja, PLLC

(57) ABSTRACT

A timer mechanism including a base piece, a top piece, a rod, and a spiral spring. The base piece includes an inner hub forming a threaded surface and a central passage. The top piece includes an inner post that a central passage and a threaded surface for engaging the inner hub. The rod is slidably disposed within the central passages and is selectively coupled to the top piece. The spiral spring is coaxially wrapped about the inner hub and terminates in a leading end connected to the top piece. The top piece is rotatable relative to the bottom piece to a raised position in which energy is stored by the spiral spring. The spiral spring rotates the top piece in an opposite direction, causing the top piece to wind relative to the bottom piece, forcing the rod downwardly for depressing a camera shutter release button.

18 Claims, 13 Drawing Sheets

SELF-TIMERED DEVICE FOR ACTIVATING A CAMERA SHUTTER RELEASE MECHANISM

CROSS-REFERENCE TO RELATED APPLICATIONS

This application is a continuation application of U.S. patent application Ser. No. 10/138,459, filed May 3, 2002, now U.S. Pat. No. 6,816,675 which claims the benefit of, and incorporates by reference the entirety of, U.S. Provisional Patent Application Ser. No. 60288,563, filed on May 3, 2001 and entitled "Self-Timered Device for Activating a Camera Shutter Release."

BACKGROUND OF THE INVENTION

The present invention relates to a timered device for actuating the shutter release mechanism of a camera. More particularly, it relates an inexpensive, easy-to-use timered device that can readily be assembled to a variety of different cameras and is capable of self-actuating the camera's shutter release mechanism.

Hand-held cameras are extremely popular, and are provided in wide variety of forms. In this regard, technological advancements have greatly enhanced the photographic capabilities of certain cameras. For example, intricate shutter control mechanisms, lens assemblies, film compositions, film developing techniques, flash components etc., have vastly elevated the ability of avid photographers to produce superior quality pictures. Conversely, in response to the demands of novice photographers, engineering efforts have also been devoted toward perfecting simplified, and thus less expensive, cameras that consistently produce highly satisfactory photographs. To this end, single use or "disposable" cameras have become highly prevalent in recent years.

The overwhelming commercial success of disposable cameras is directly related to their low cost and convenience. With these overriding goals in mind, then, manufacturers strive to simplify the disposable camera design as much as possible. The typical disposable camera is a basic point-and-shoot device containing an unexposed roll of film. Other standard features include a fixed-focus lens, a manual film forwarding mechanism, a single-blade shutter, a plastic encasement, and a manually depressible shutter release button. Other than a rudimentary flash device, disposable cameras generally do not have any additional features otherwise available with more expensive cameras. While highly viable, the inherently simplistic design of disposable cameras gives rise to certain drawbacks.

In particular, disposable cameras are not provided with a "self-portrait" or automatic shutter release feature. That is to say, disposable cameras do not afford a user the ability to take a "hands-free" picture. With more expensive cameras, a timered shutter release feature is commonly provided as an intricate mechanism or digital-based operation within the camera body. Due to cost constraints, these available automated shutter release techniques are not feasible for disposable camera applications. Even further, the steps for setting and activating these "built-in" hands-free features are usually quite complicated, even for an experienced photographer.

Some efforts have previously been made to devise a standalone, remote control shutter release actuator useful with disposable cameras. Generally speaking, the auxiliary device mounted to the camera's shutter release button, and incorporates components for actuating or otherwise depressing the button from a position remote of the camera. For example, pneumatic-based instruments have been envisioned, whereby a flexible hose is somehow attached over the shutter release button. The user then forces air through the hose, such as via a squeeze bulb, theoretically actuating the shutter release button. Unfortunately, it is exceedingly difficult to mount a flexible tube over the shutter release button. Further, a relatively lengthy hose is required. Therefore, these pneumatic-based devices are not compact or easy to transport, directly contrary to the desired convenience of disposable cameras.

Alternatively, intricate, self-contained, gear-based mechanisms have also been contemplated. For example, Japanese Patent Application Publication 5-158146 to Jiyoriibu Iwaya K K describes a self-timing device for a camera. The disclosed device includes an adjustable clamp-holder that must be mounted and aligned with the camera. Within the device itself, a series of gears, cams, and springs, including a spiral spring, are utilized to direct a push rod portion of a plate component to depress the shutter release button. In this regard, a user-operated turning knob is connected to the spiral spring and is employed to provide requisite energy to the spring. Notably, a central axis of the spring is perpendicular to the axis of the push rod such that an elevated spring force is required to actuate the intricate cam and gear train. Further, the plate component pivots to "depress" the push rod, such that the push rod does not move in a truly linear fashion. As a result, depending upon the particular configuration of the camera shutter release button, this arcuate motion may not fully depress the button. Also, the mounting system and multiple component actuation system is complex and therefore expensive to manufacture. In light of the inexpensive nature of disposable cameras, the disclosed design is likely cost prohibitive to be commercially viable. Finally, the mounting and alignment technique is specific to one style of camera design, and likely cannot be employed with other types of cameras.

Disposable cameras continue to be highly popular. Unfortunately, however, to minimize costs, disposable cameras are not provided with a self-portrait or hands-free feature. Efforts to provide an auxiliary device capable of performing this function have been unavailing. Therefore, a need exists for a simple, inexpensive, universal timered shutter release actuator useful with virtually any camera, especially disposable cameras.

SUMMARY OF THE INVENTION

One aspect of the present invention relates to a timer mechanism for actuating a shutter release button of a camera. The mechanism includes a base piece, a top piece, a rod, and a spiral spring. The base piece includes a bottom portion and an inner hub. The inner hub extends axially upwardly from the bottom portion, and forms a threaded surface and a central passage. The top piece is threadably mated to the base piece and includes a head portion and an inner post. The inner post extends axially downwardly from the head portion, and forms a central passage and a threaded surface. The threaded surface is configured to, upon final assembly, threadably engage the threaded surface formed by the inner hub, such that central passages are aligned. The rod is slidably disposed within the central passages and is selectively coupled to the top piece. Finally, the spiral spring is coaxially wrapped about the inner hub. The spiral spring terminates in a leading end that is connected to the top piece. With this configuration, the top piece is rotatable relative to the bottom piece in a first direction to a raised position in which energy is stored by the spiral spring. The spiral spring is adapted to rotate the top piece in an opposite direction, causing the top piece to wind downwardly relative to the bottom piece via interface between the threaded surfaces, the top piece forcing the rod downwardly through the central passages for depressing a camera shutter release button during the downward movement. In one preferred embodiment, the timer device is formed separate from the camera, and includes a mounting component for securing the mechanism to the camera. Alternatively, the mechanism is provided as a built-in feature of a camera.

DESCRIPTION OF THE PREFERRED EMBODIMENTS

Figure 1:
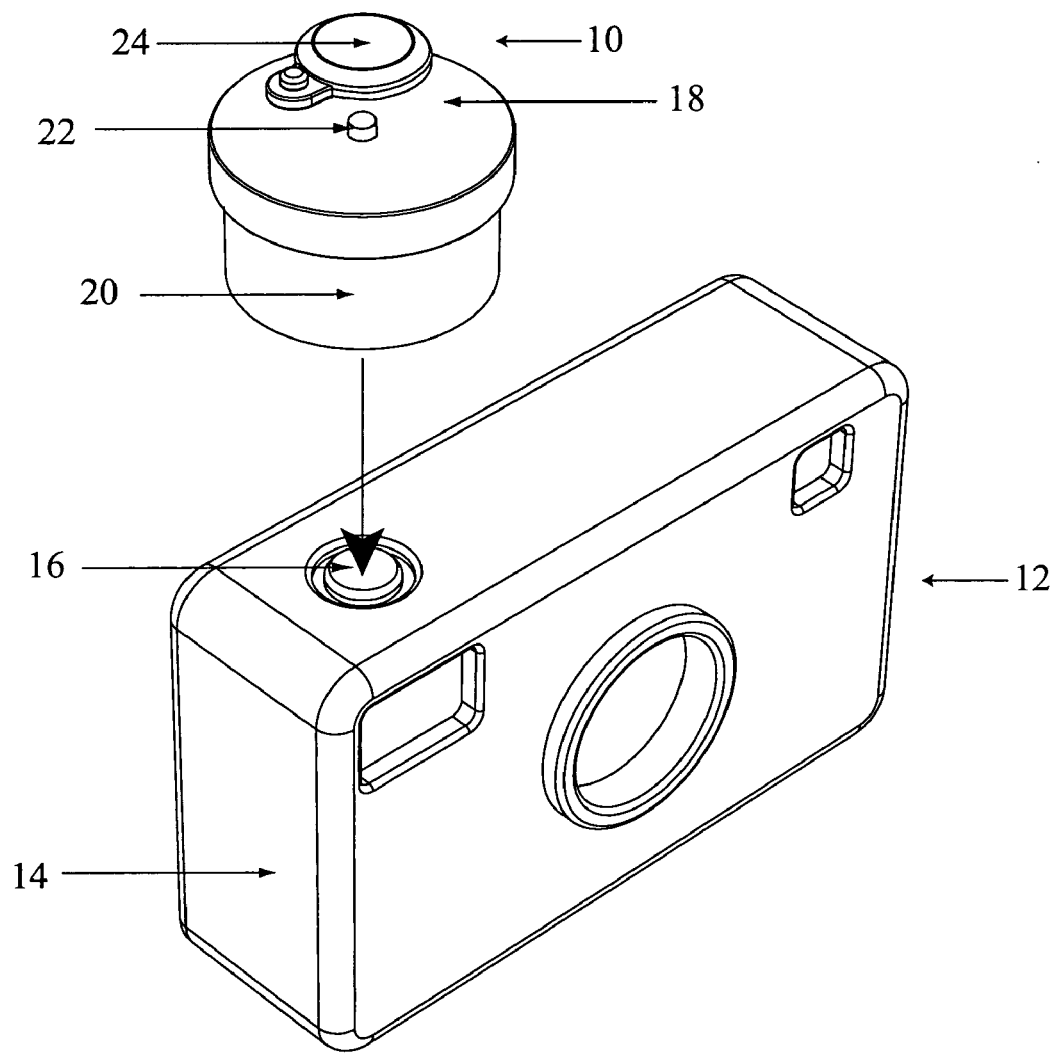
FIG. 1 is a perspective view of a timer device in accordance with the present invention and in conjunction with a camera.

One preferred embodiment of a timer device 10 in accordance with the present invention is provided in FIG. 1 in conjunction with a camera 12. As a point of reference, the camera 12 can assume a wide variety of forms, but generally includes a case 14 and a shutter release button 16. Operation of the camera 12 by a user (not shown) generally entails depressing the shutter release button 16. In this regard, the timer device 10 is configured for mounting to the case 14 and to automatically depress the shutter release button 16 after a short time period following initiation of the timer device 10.

The various components of the timer device 10 are provided below. In general terms, however, the device 10 includes a top piece 18, a base piece 20, a rod 22, and a cap 24. It should be understood that as used throughout this specification, directional terminology such as "top," "bottom," "upper," "lower," "upwardly," "downwardly," etc. are used for purposes of illustration relative to an orientation of the timer device 10 in FIG. 1. However, the timer device 10 can be placed in a number of different orientations such that the directional terminology is in no way limiting. With this in mind, the top piece 18 is rotatably connected to the base piece 20, and the device 10 is configured such that upon downward movement of the top piece 18 relative to the base piece 20, the rod 22, via the cap 24, mechanically depresses the shutter release button 16.

Figure 2:
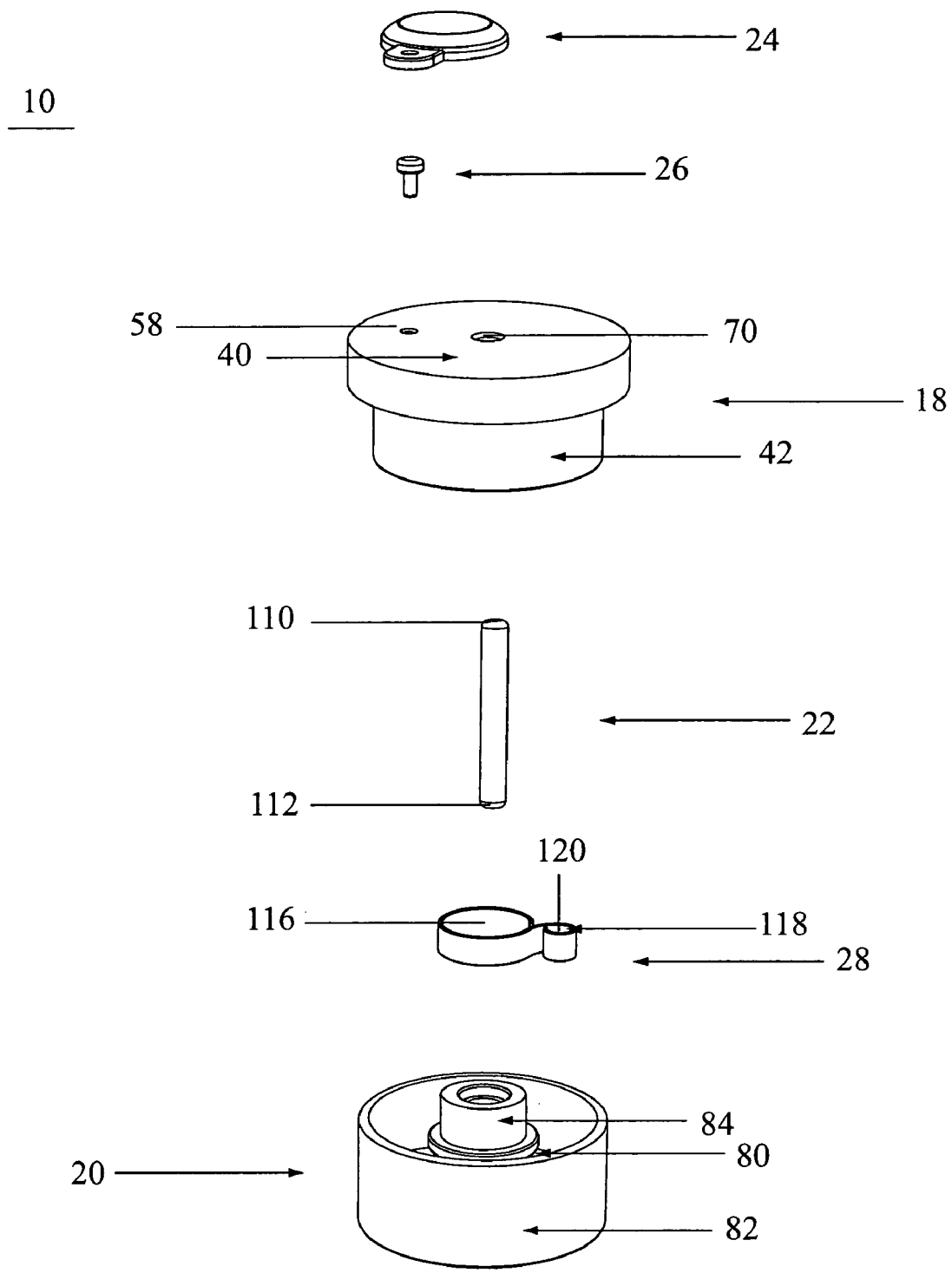
FIG. 2 is a perspective, exploded view of the device of FIG. 1.

The timer device 10 is shown in greater detail in FIG. 2, and includes the top piece 18, the base piece 20, the rod 22, the cap 24, a pin 26, and a spiral spring or memory tape 28. As described in greater detail below, the top piece 18 and the bottom piece 20 combine to axially maintain the rod 22. Further, the top piece 18 rotatably is secured to the bottom piece 20. The spiral spring 28 is connected to the top piece 18. Finally, the pin 26 pivotably connects the cap 24 to the top piece 18, such that the cap 24 selectively captures the rod 22.

Figure 3A:
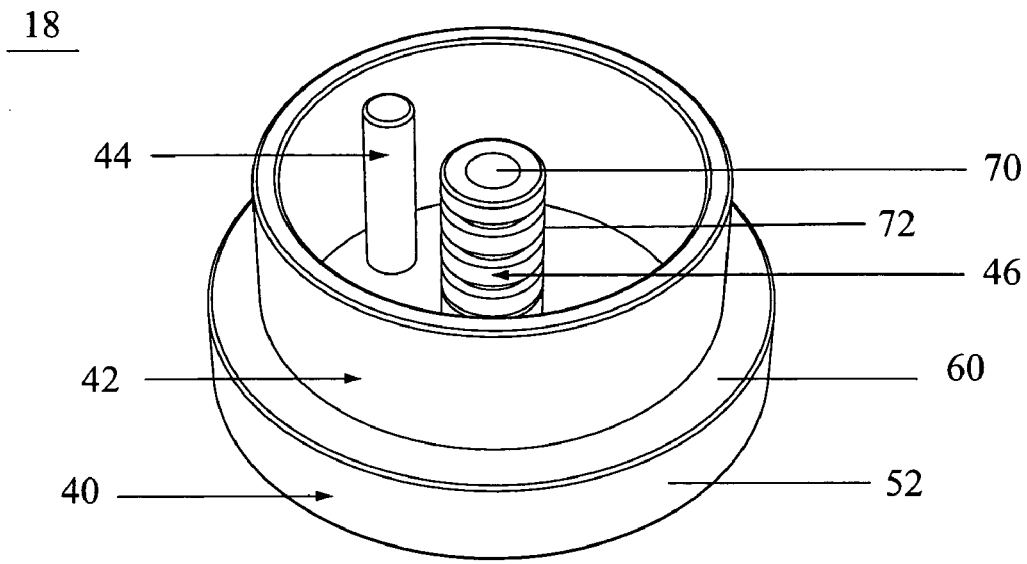
FIG. 3A is a bottom, perspective view of a top piece portion of the device of FIG. 1.
Figure 3B:
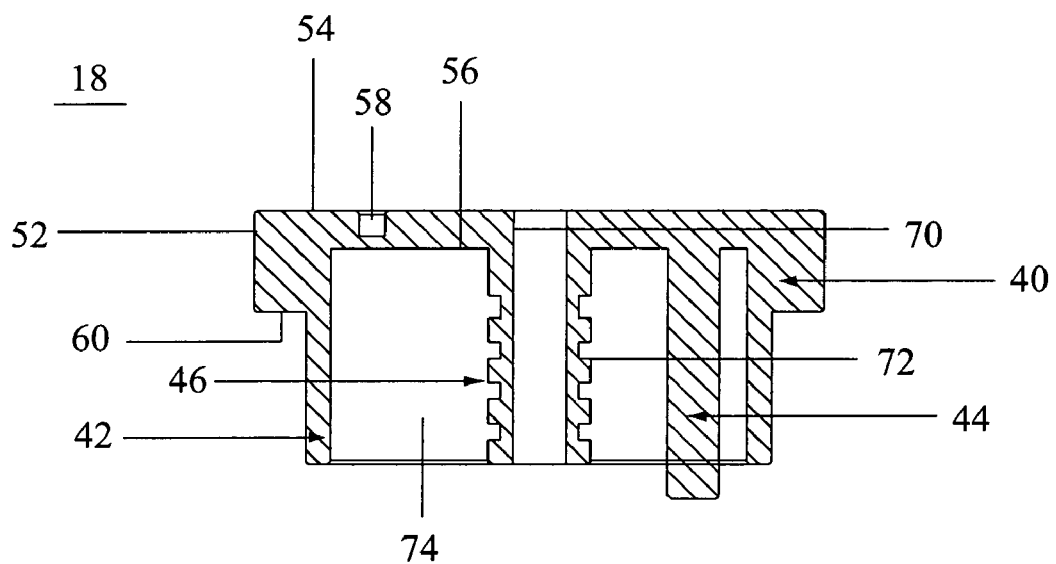
FIG. 3B is a cross-sectional view of the top piece of FIG. 3A.

With additional reference to FIGS. 3A and 3B, the top piece 18 is preferably integrally formed to include a head portion 40, an intermediate ring 42, a retention device 44, and an inner post 46. As described below, each of the intermediate ring 42, the retention device 44 and the inner post 46 extend axially downwardly from the head portion 40 (relative to the orientation of FIG. 3B).

The head portion 40 is preferably a circular disc defining a rim 52, an outer surface 54, and an inner surface 56. In this regard, the rim 52 forms, in one preferred embodiment, a series of ridges or grooves that facilitate grasping thereof by a user. The rim 52 preferably defines a diameter in the range of 1.0–1.6 inches, more preferably 1.35 inches, although other dimensions are acceptable. The head portion 40 further forms an aperture 58 extending through the outer surface 54.

The intermediate ring 42 is coaxially aligned with a central axis of the head portion 40 and extends downwardly from the inner surface 56. As best shown in FIG. 3A, the intermediate ring 42 has a diameter less than a diameter of the rim 52 such that a shoulder 60 is defined therebetween. Further, the intermediate ring 42 is sized to nest within a corresponding portion of the bottom piece 20, as described below.

The retention device 44 is preferably in the form of a shaft or peg extending axially downwardly from the inner surface 56 of the head portion 40. As described in greater detail below, the retention device 44 is provided to couple the spiral spring 28 to the top piece 18. As such, the retention device 44 can assume a wide variety of other forms. Regardless, the retention device 44 is preferably positioned radially within the intermediate ring 42. For example, with respect to the one preferred embodiment, the retention device 44 is positioned, relative to a central axis of the head portion 40, at a radius less than a radius defined by the intermediate ring 42. Further, for reasons made clear below, the retention device 44 in the one preferred embodiment is offset from the central axis of the top piece 18. Finally, with the one preferred embodiment in which the retention device 44 is a downwardly extending shaft, extension of the shaft 44 relative to the outer surface 54 is less than that of the intermediate ring 42. That is to say, the intermediate ring 42 extends below the shaft 44.

The inner post 46 is centered relative to a center of the head portion 40, and forms a passage 70 and a threaded surface 72. As shown in FIG. 3B, the passage 70 is coaxially positioned relative to the head portion 40, and extends through the inner post 46 and the head portion 40 such that the passage 70 is open at the outer surface 54. In one preferred embodiment, the threaded surface 72 is formed on an exterior portion of the inner post 46, and is configured to threadably receive a corresponding portion of the top piece 18 as described in greater detail below. In one preferred embodiment, a downward extension of the inner post 46 corresponds with that of the intermediate ring 42 such that respective ends of the intermediate ring 42 and the inner post 46 are longitudinally aligned. Finally, the preferred central location of the inner post 46 dictates that the inner post 46 is positioned radially within the intermediate ring 42. With this configuration, a receiving zone 74 is established between the intermediate ring 42 and the inner post 46. As shown, the retention device 44 extends within the receiving zone 74.

The top piece 18 is preferably integrally formed from a relatively rigid material, such as plastic. Alternatively, other hard materials, such as stainless steel, ceramic, etc., are equally acceptable. Additionally, one or more of the various components, including the head portion 40, the intermediate ring 42, the retention device 44 and/or the inner post 46 can be separately formed and subsequently assembled. Even further, certain components, such as the intermediate ring 42, can be eliminated.

Figure 4:
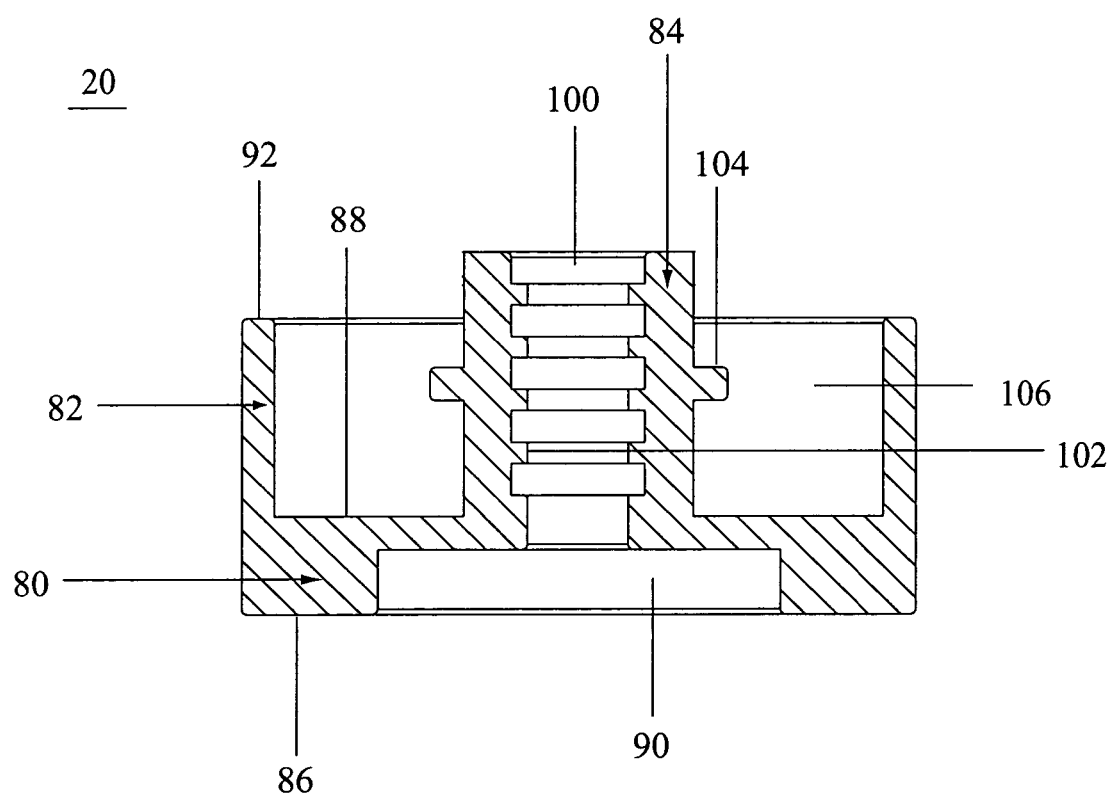
FIG. 4 is a cross-sectional view of a base piece portion of the device of FIG. 1.

Returning to FIG. 2, and with additional reference to FIG. 4, the base piece 20 includes a bottom portion 80, an outer ring 82, and an inner hub 84. As described in greater detail below, the outer ring 82 and the inner hub 84 extend in an axial fashion upwardly from the bottom portion 80.

As best shown in FIG. 4, the bottom portion 80 defines a bottom surface 86 and an inner surface 88. In one preferred embodiment, the bottom surface 86 forms a central recess 90. The central recess 90 is preferably sized for placement about a shutter release button 16 (FIG. 1) associated with a camera (such as the camera 12 of FIG. 1). So as to be universally applicable to most available cameras, the recess 90 has a diameter of approximately 0.625 inch, and a height (or longitudinal extension) of approximately 0.1875 inch. Alternatively, other dimensions are equally acceptable.

The outer ring 82 is defined by a diameter and height corresponding with the intermediate ring 42 of the top piece 18. In particular, the outer ring 82 preferably has an inner diameter slightly greater than an outer diameter of the intermediate ring 42. With this configuration, then, upon final assembly, the intermediate ring 42 will nest within the outer ring 82. Further, an extension or height of the outer ring 82 relative to the inner surface 88 of the bottom portion 80 is preferably identical to the extension or height of the intermediate ring 42 relative to the shoulder 66 (FIG. 3A). With this configuration, and upon final assembly, in a lowered position, an upper surface 92 of the outer ring 82 contacts the shoulder 60, whereas the intermediate ring 42 contacts the inner surface 88 of the bottom portion 80.

The inner hub 84 is coaxially aligned with the bottom portion 80 and forms a central passage 100, a threaded surface 102, and a shelf 104. In one preferred embodiment, the threaded surface 102 is formed interiorly relative to the inner hub 84 and is configured to threadably receive the threaded surface 72 (FIG. 3A) of the top piece 18. Upon final assembly, then, the central passages 70 (FIG. 3A), 100, are aligned. Further, the central passage 100 extends to the recess 90 such that the central passage 100 is open at the bottom portion 80. The shelf 104 is formed as a radial extension along the inner hub 84. As described in greater detail below, the shelf 104 is sized to receive and maintain the spiral spring 28. As such, a vertical location of the shelf 104 is dictated by a height or thickness of the spiral spring 28 relative to a downward extension of the retention device 44 of the top piece 14; the shelf 104 is located to position the spiral spring 28 for engagement with the retention device 44. Finally, the inner hub 84 preferably has a height or axial extension greater than that of the outer ring 82.

As best shown in FIG. 4, the inner hub 84 is positioned radially within the outer ring 82, thereby establishing an internal spacing 106. The internal spacing 106 is sized to maintain various components of the timer device 10 upon final assembly.

Similar to the top piece 18, the base piece 20 is preferably integrally formed from a relatively rigid material, such as plastic. Alternatively, other hard materials are equally acceptable. Further, one or more of the bottom portion 80, the outer ring 82, and/or the inner hub 84 can be separately formed and subsequently assembled. Even further, certain components, such as the outer ring 82, can be eliminated.

Referring to FIG. 2, the rod 22 is sized to be slidably disposed within the central passage 70 (FIG. 3A) of the top piece 18. The rod 22 defines a top end 110 and a bottom end 112. In a preferred embodiment, the rod 22 is formed from a relatively rigid material, such as styrene, although other materials are equally acceptable. Further, the rod 22 is formed to have a length at least slightly greater than a combined height of the top piece 18 and the base piece 20 when the top piece 18 is completely threaded or lowered within the base piece 20. With reference to one preferred embodiment in which, in the lowered position, the outer ring 82 of the base piece 20 contacts the shoulder 60 of the top piece 18, then, the rod 22 has a length at least slightly greater than an axial height or length defined by a combination of the rim 52 and the base piece 20. With this configuration, the rod 22 will extend slightly above the head portion 40 (via the outer surface 54), as well as slightly below the bottom surface 86 of the base piece 20 (via the passage 100 and the recess 90). In one preferred embodiment, the rod 22 is sized to extend a distance in the range of 0.1–0.2 inch, more preferably 0.135 inch below the bottom surface 86 in the lowered or retracted position. Further, the rod 22 preferably has a diameter in the range of 0.1–0.5 inch, more preferably 0.125 inch, that has been found to be sufficiently small enough to contract virtually any available camera shutter release button, yet provide sufficient structural strength for proper operation of the timer mechanism 10.

The cap 24 is configured to be pivotably secured to the top surface 58 of the top piece 18 via the pin 26. Further, the cap 24 is configured to selectively capture the top end 110 of the rod 22. That is to say, when maneuvered over the passage 70 at the outer surface 54, the cap 24 is configured to capture the rod 22 and prevent the top end 110 from protruding beyond the top surface 54.

The spiral spring 28 is of a type commonly known in the art and is defined by one or more circumferential windings 116 and terminates at a leading end 118. Regardless of the number of circumferential windings 116, the spiral spring 28 defines an interior diameter corresponding with an exterior diameter of the inner hub 84 of the base piece 20. More particularly, the spiral spring 28 is sized to be axially disposed over the inner hub 84, resting on the shelf 104 formed thereby. Further, the leading end 118 is configured to be mounted to the retention device 44 formed by the top piece 18. In accordance with the one preferred embodiment whereby the retention device 44 is a shaft, the leading end 118 forms an aperture 120 sized to frictionally engage the retention device 44. Alternatively, the leading end 118 can assume other forms corresponding with a configuration of the retention device 44.

The spiral spring 28 can assume a variety of constructions, and is preferably formed from metal. The corresponding number of the circumferential windings 116 is related to the material chosen for the spiral spring 28, as well as a construction of the threads 72, 102. The spacing and pitch of the threads 72, 102 dictates the number of revolutions the top piece 18 travels between the lowered position and the extended position, and thus the minimum number of circumferential windings 116. Further, the circumferential windings 116 in conjunction with the selected material provide the spiral spring 28 with a spring force sufficient to rotate the top piece 18 relative to the base piece 20 via the threaded surfaces 72, 102 as described in greater detail below.

Figure 5:
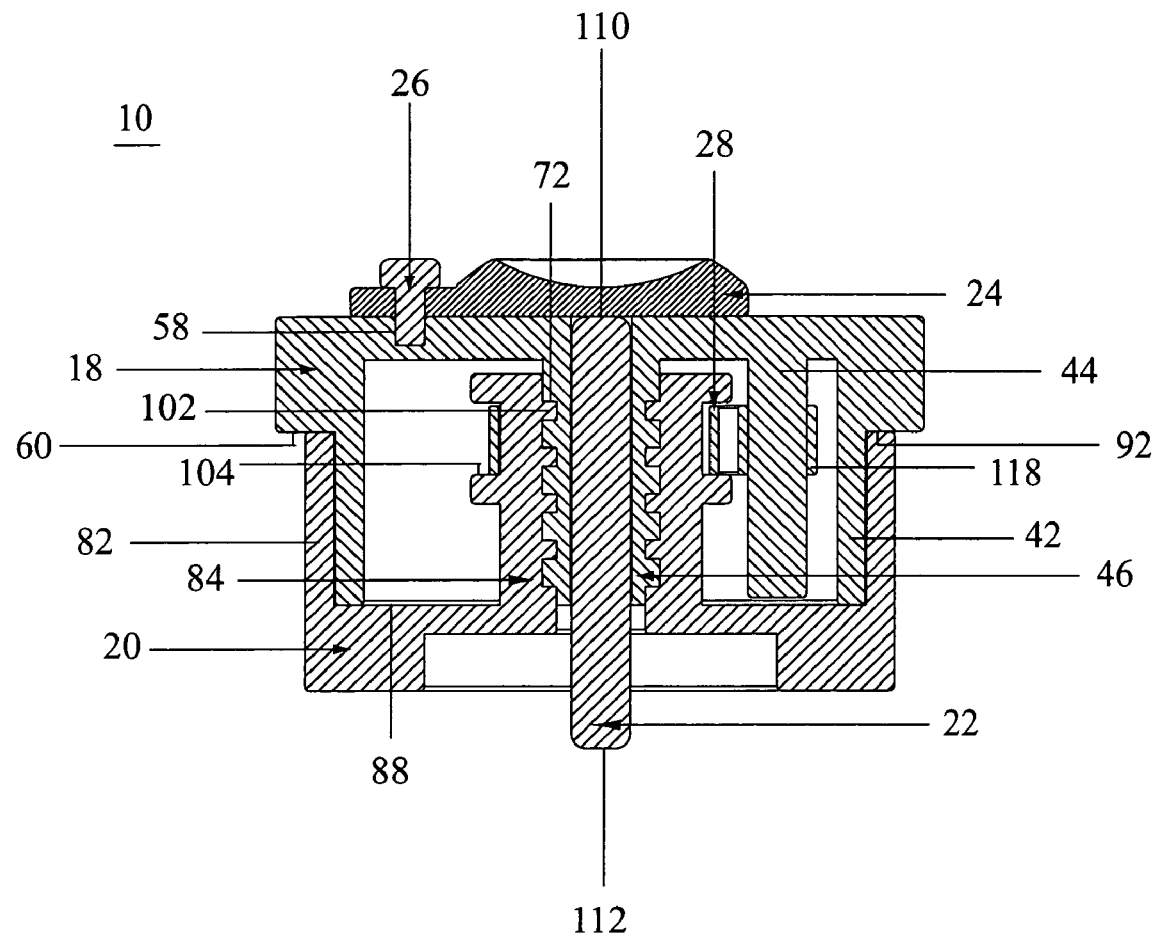
FIG. 5 is a cross-sectional view of the device of FIG. 1.

Assembly of the timer device 10 is best described with reference to FIG. 5. The pin 26 pivotably secures the cap 24 to the top piece 18 at the aperture 58. The spiral spring 28 is coaxially disposed over, and fastened to, the inner hub 84, resting on the shelf 104. An inner most winding of the spiral spring 28 is preferably frictionally maintained by the inner hub 84. Alternatively, an adhesive or other mechanical attachment device can be employed. Regardless, prior to assembly of the top piece 18, the spiral spring 28 is forcibly extended or unwrapped a predetermined number of revolutions or partial revolutions. In particular, the radial unwinding and extension of the spiral spring 28 corresponds with a configuration of the threaded surfaces 72, 102, and in particular, a length and spacing of the individual threads, as described below.

Once the spiral spring 28 has been extended or unwrapped a predetermined amount, the top piece 18 is aligned with the base piece 20. The retention device 44 is placed within the leading end 118 of the spiral spring 28. In this regard, the retention device 44 is preferably configured to allow the leading end 118 to slide along a length of the retention device 44. Concurrently, the inner post 46 of the top piece 18 is aligned with the inner hub 84 of the base piece 20. In this aligned configuration, the threaded surfaces 72, 102 engage one another. The top piece 18 is then released. The energy stored by the spiral spring 28 acts upon the retention device 44, and thus the top piece 18. In particular, the spiral spring 28 places a force onto the retention device 44, causing the top piece 18 to rotate relative to the base piece 20. The threaded engagement between the threaded surfaces 72, 102, in turn, causes the top piece 18 to move downwardly onto the base piece 20. Movement of the top piece 18 relative to the base piece 20 is stopped upon contact between the outer ring 82 of the base piece 20 and the shoulder 60 of the top piece 18 and/or contact between the intermediate ring 42 of the top piece 18 and the inner surface 88 of the base piece 20. As a point of reference, FIG. 5 illustrates the timer device 10 in a minimal extension (or retracted or passive) position. In this regard, the timer device 10 is preferably configured to provide a streamlined profile in the related position, preferably having a height in the range of 0.5–10 inch, more preferably 0.81 inch.

With the top piece 18 assembled to the base piece 20, the cap 24 is maneuvered away from the passage 70 formed by the top piece 18. The rod 22 is then axially disposed within the passage 70. Upon final assembly, the central axis of the spiral spring 28 is parallel with a central axis of the rod 22, as well as an axis defined by the threads 72, 102. Preferably, all components 22, 28, 72, 102 are co-axially arranged. As a result, and unlike other timer devices, the timer device 10 of the present invention allows the force of the spiral spring 28 to act directly upon the thread system 72, 102, and thus the rod 22. Further, this arrangement allows the rod 22 to move longitudinally or vertically (as opposed to an arcuate, pivoting-type motion), thereby ensuring a consistent downward force.

Use of the timer device 10 is described in greater detail below. In general terms, however, the timer device 10 provides two modes of operation. In a first mode, the cap 24 is maneuvered away from the passage 70 such that top end 110 of the rod 22 is exposed. When the timer device 10 is assembled to a camera (not shown), a user (not shown) can simply press downwardly on the rod 22 (via the top end 110), causing the rod 22 to project downwardly and depress a shutter release button (not shown).

Alternatively, during a "hand-free" shutter release activation operation, a user rotates the top piece 18 relative to the base piece 20. In particular, the top piece 18 is rotated such that interaction between the threaded surfaces 72, 102 causes the top piece 18 to extend upwardly, away from the base piece 20. During this rotational action, the retention device 44 causes the spiral spring 28 to "unwind" from the relaxed state shown in FIG. 5. The cap 24 is then pivoted to a closed position in which the cap 24 encompasses the passage 70, and thus, the rod 22. The top piece 18 is then released, with the spiral spring 28 slowly forcing the top piece 18 to rotate in an opposite direction. As a result, the top piece 18 moves downwardly relative to the base piece 20. At a certain point during the downward movement of the top piece 18, the cap 24 engages the top end 110 of the rod 22. Further downward movement of the top piece 18 relative to the base piece 20 drives the rod 22 downwardly such that the bottom end 112 extends below the bottom surface 86 of the base piece 20. The spring force provided by the spiral spring 28, in combination with a construction of the threads 72, 102, provides a "drag" during this winding operation (i.e., transition to the relaxed or passive position), resulting in a delay in the range of 5–60 seconds between release of the top piece 18 and actual shutter button depression.

Figure 6:
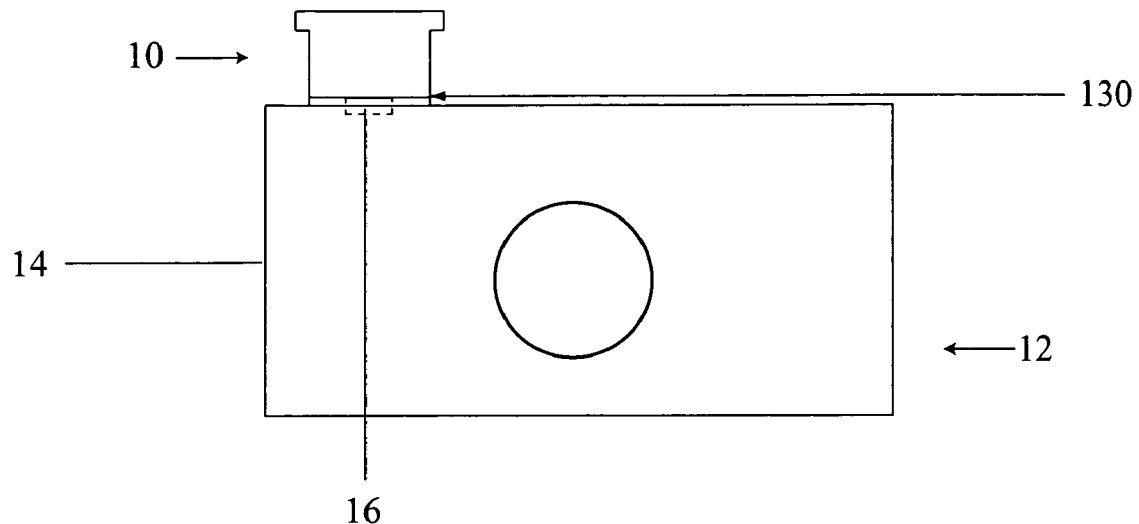
FIG. 6 is a front view of the timer device of FIG. 1 fastened to a camera using a mounting device.

In one preferred embodiment, the timer device 10 is provided as a separate component. With this configuration, the timer device 10 can be assembled to a camera (such as the camera 12 of FIG. 1) in a variety of fashions. For example, FIG. 6 illustrates the timer device 10 mounted to the camera 12 via a coupler ring 130. In one preferred embodiment, the coupler ring 130 includes an adhesive (not shown) on both sides thereof. With this configuration, the coupler 130 is adhered to the case 14 of the camera 12 about the shutter release button 16. The timer device 10 is then adhered to an opposite side of the coupler ring 130. Alternatively, other forms of securing the coupler ring 130 to the camera 12 and the timer device 10 are equally acceptable. For example, the coupler ring 130 can be comprised of two sections; a first one of which is adhered to the case 14 and the second of which is secured to the timer device 10. The ring sections further include corresponding hook-and-loop materials that selectively fasten the two sections to one another.

Figure 7:
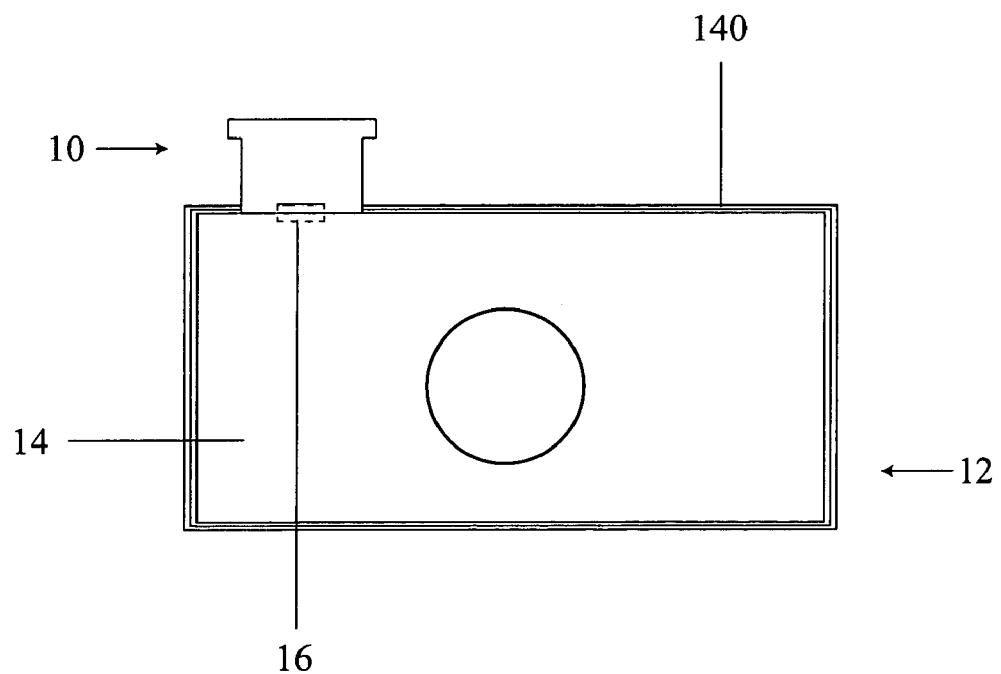
FIG. 7 is a front view of the timer device of FIG. 1 assembled to a camera using an alternative mounting device.

An alternative approach to coupling the timer device 10 to the camera 12 is illustrated in FIG. 7. With this embodiment, a strap 140 is secured to the base piece 20 of the timer device 10. The strap 140 is formed from an elastic or rubber-like material and can therefore be stretched. With this configuration, then, the strap 140 is then stretched about the camera 12, and the timer device 10 aligned over the shutter release button 16. It is noted that with many cameras, especially disposable cameras, the case 14 is comprised of two sections, assembly of which forms a parting line. This parting line is highly amenable to receiving the strap 140.

Any of the mounting techniques described above allows the timer device 10 to be selectively secured to a wide variety of different cameras. That is to say, unlike other timer devices, the coupling techniques do not require a rigid auxiliary frame and thus avoids the corresponding application limitations associated with prior timer devices. Further, while the camera 12 has been preferably described as being a disposable-type camera, the timer device 10 can be coupled to any other type of camera, including non-disposable cameras already having a hands-free feature. In this regard, it is noted that the self-portrait feature associated with existing cameras is often times difficult to readily understand and/or effectuate. Thus, the timer device 10 of the present invention can be easily used to provide hands-free activation of virtually any camera. Even further, while the timer device 10 has been described as preferably being a component separate from the camera 12, the timer device 10 can instead be integrally formed with the camera 12. In contrast to available self-portrait mechanisms and/or programs, the timer device 10 of the present invention is easily understood and operated.

Figure 8:
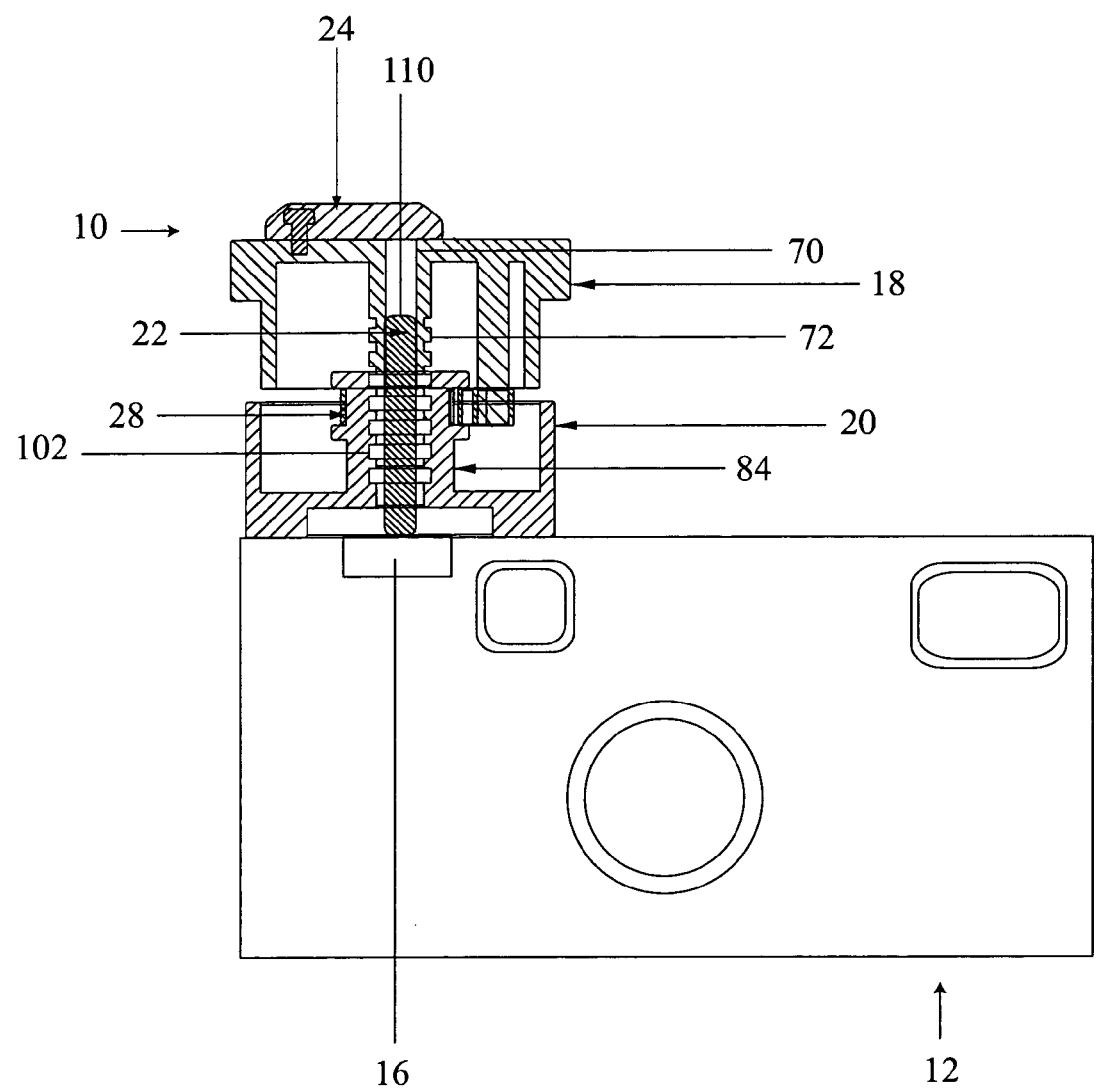
FIGS. 8 and 9 illustrate use of the timer device of FIG. 1 with a camera.
Figure 9:
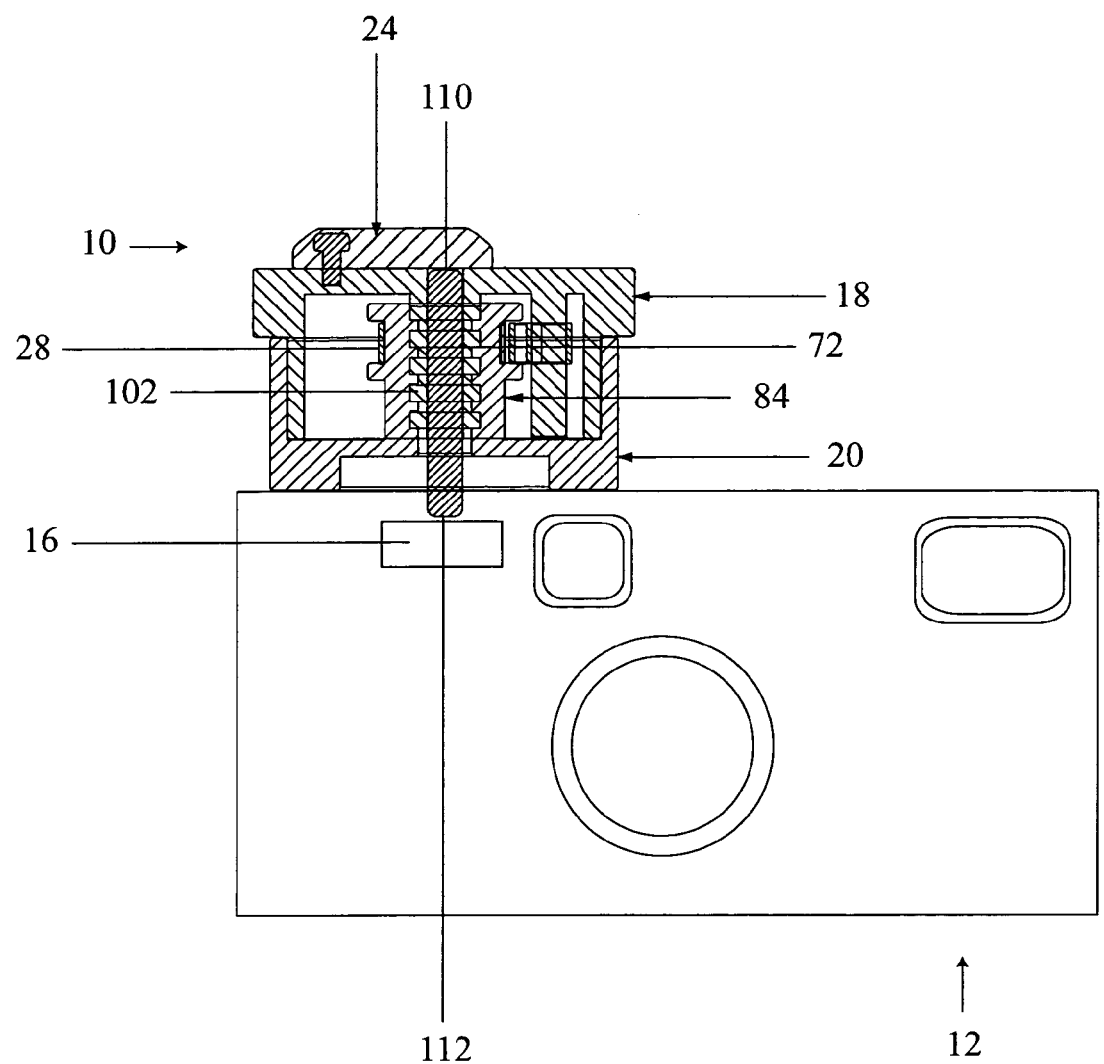

Operation of the timer device 10 in conjunction with the camera 12 is described in further detail with reference to FIGS. 8 and 9. With respect to FIG. 8, the timer device 10 is shown in a "raised" position whereby the top piece 18 has been maneuvered upwardly relative to the base piece 20. Once again, in the raised position, the spiral spring 28 is forcibly unwound, and therefore, stores energy. Further, the cap 24 has been rotated over the passage 70 such that the cap 24 will capture or engage the top end 110 of the rod 22. The user (not shown) then releases the top piece 18 and steps away from the camera 12. Energy stored by the spiral spring 28 then causes the top piece 18 to automatically rotate about the inner hub 84 of the base piece 20. Once again, engagement between the respective threaded surfaces 72, 102 causes the top piece 18 to move downwardly relative to the base piece 20 during rotation thereof. The cap 24 contacts the top end 110 of the rod 22. Further rotation of the top piece 18 then drives the rod 22 downwardly to the position shown in FIG. 9, whereby the bottom end 112 of the rod 22 depresses the shutter release button 16 of the camera 12. As previously described, depending upon construction of the spiral spring 28 and the threads 72, 102 the time period required for the spiral spring 28 to rotate the top piece 18 from the extended position of FIG. 8 to the retracted position of FIG. 9 can be selected as desired, ranging from 5–60 seconds. Finally, relative to the orientation of FIG. 9, the cap 24 can be rotated away from the passage 70 such that the rod 22 freely extends above the top piece 18. In this orientation, the user can simply depress the top end 110 of the rod 22 to manually depress the shutter release button 16.

Figure 10:
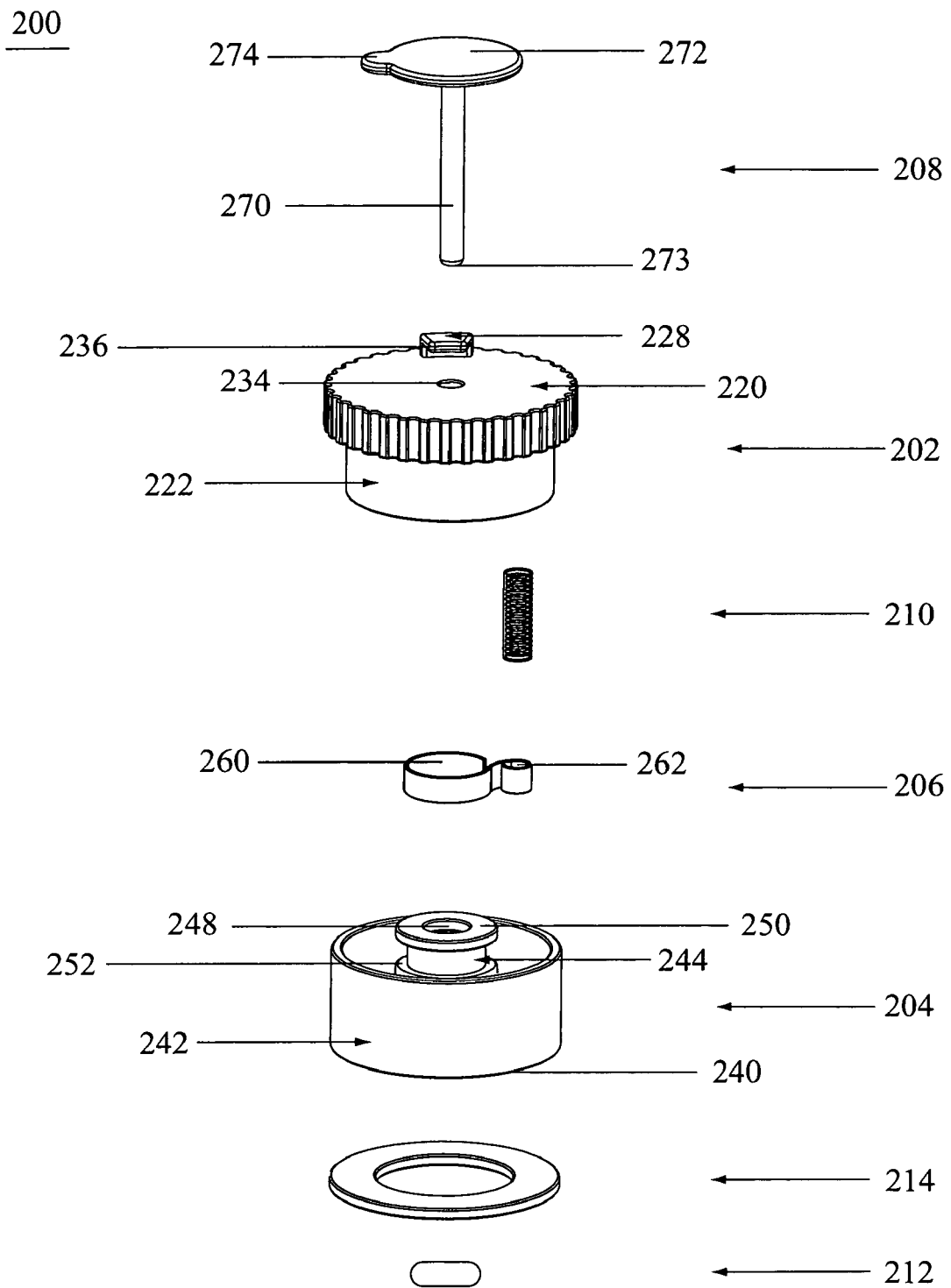
FIG. 10 is a perspective, exploded view of an alternative embodiment timer device in accordance with the present invention.

An alternative embodiment timer device 200 is shown in exploded form in FIG. 10. The timer device 200 is highly similar to the timer device 10 (FIG. 2) previously described, and includes a top piece 202, a base piece 204, a spiral spring 206, a rod piece 208, a coil spring 210, and a stopper 212. In one preferred embodiment, and as previously described, the timer device 200 is provided with a mounting device 214, such as a ring with an adhesive coating on opposing sides thereof, for mounting the timer device 200 to a camera (not shown). In general terms, and similar to the previous embodiment, the top piece 202 threadably engages the base piece 204, with the spiral spring 206 forcing the top piece 202 to rotate and move downwardly relative to the base piece 204 from a raised or extended position. The stopper 212 prevents the rod piece 208 from disengaging the top piece 202 and the base piece 204. Finally, the coil spring 210 serves to control downward winding of the top piece 202 relative to the base piece 204 via the spiral spring 206.

Figure 11:
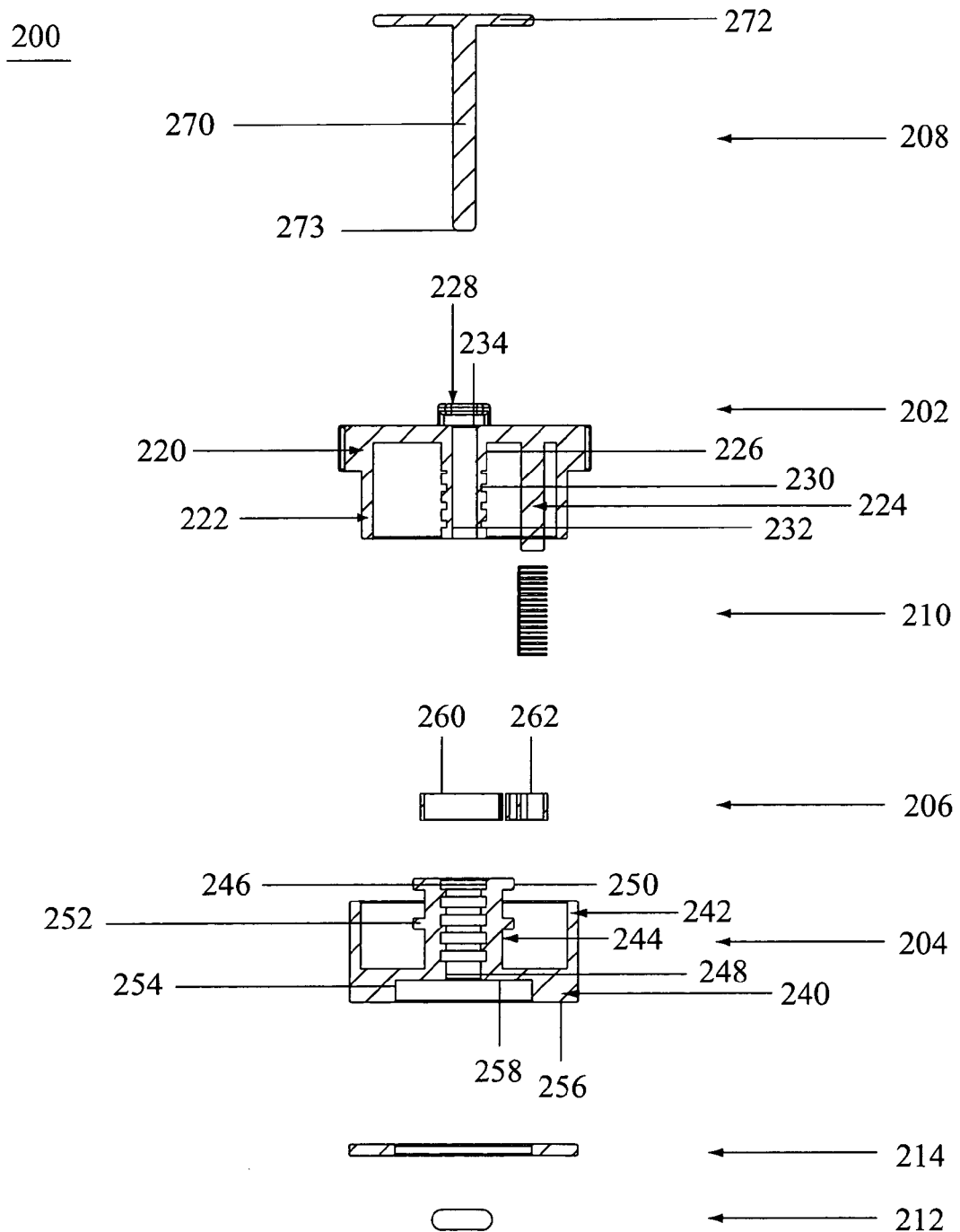
FIG. 11 is an enlarged, cross-sectional view of a portion of the device of FIG. 10.

With additional reference to FIG. 11, the top piece 202 includes a head portion 220, an intermediate ring 222, a retention device 224, an inner post 226, and a tab 228. The top piece 202 is similar to the top piece 14 (FIGS. 3A and 3B), with the head portion 220, the intermediate ring 222, the retention device 224, and the inner post 226 being nearly identical to that previously described. For example, the retention device 224 is preferably an offset shaft. Similarly, the inner post 226 preferably forms exterior threads 230 and a central passage 232 extending to an opening 234 in the head portion 220. In addition, the top piece 202 includes the tab 228 secured to an outer surface of the head portion 220. The tab 228 is preferably L-shaped and is positioned away from the opening 234, and thus the central passage 232, formed through the top piece 202. As described in greater detail below, the tab 228 forms a crown 236 configured to selectively engage a portion of the rod piece 208.

The base piece 204 is preferably identical to the base piece 20 (FIG. 2) previously described and includes a bottom portion 240, and outer ring 242, and an inner hub 244. The inner hub 244 defines interior threads 246 formed about a central passage 248, as well as an upper shelf 250 and a lower shelf 252. The inner hub 244 is sized to coaxially receive the spiral spring 206, with the shelves 250, 252 maintaining the spiral spring 206 at a desired position. Finally, for reasons made more clear below, the bottom portion 240 preferably forms a recess 254 co-axially aligned with the central passage 248. The recess 254 extends from a bottom surface 256 and terminates at an engagement surface 258. As illustrated in FIG. 11, the recess 254 has a diameter greater than a diameter of the central passage 248.

The spiral spring 206 is preferably identical to the spiral spring 28 (FIG. 2) previously described. In this regard, the spiral spring 206 includes circumferential windings 260 and a leading end 262.

The rod piece 208 includes a rod 270 and a cap 272. The rod 270 extends axially downwardly from the cap 272, and terminates in a bottom end 273. As with previous embodiments, the rod 270 is sized to be slidably received within the passages 232, 248 defined by the top piece 202 and the base piece 204, respectively. The cap 272 is preferably generally circular, defining a radial projection or tongue 274 (shown best in FIG. 10). The radius of the cap 262, as well as the radial extension of the tongue 274 corresponds with a position of the tab 228 relative to the opening 234 formed by the top piece 202. More particularly, the radius of the cap 272 at all regions other than the tongue 274 is less than a radial position of the crown 236 relative to a central axis of the opening 234. Conversely, a radial extension of the tongue 274 is greater than the radial position of the crown 236 relative to the opening 234. With this configuration, then, upon final assembly of the rod 270 within the central passage 232, the tab 228 will selectively engage the tongue 274 when the cap 272 is rotated to a "locked" position. Conversely, in an "unlocked" position, the cap 272 is rotated such that the tongue 274 does not engage the tab 228.

The coil spring 210 is of a type known in the art, and is sized to be coaxially received about the retention device 224 of the top piece 202. As described below, the coil spring 210 is preferably relatively radially rigid, yet is axially compressible and biased to return to an uncompressed state.

Finally, the stopper 212 is configured to capture the rod piece 208 relative to the base piece 204, and is generally ring-shaped. In one preferred embodiment, the stopper 212 is an O-ring, although other configurations are equally acceptable. Regardless, the stopper 212 is sized to be co-axially placed over, and retained by, the rod 270. Further, the stopper 212 is sized in accordance with the recess 254 of the base piece 204. More particularly, the stopper 212 defines an outer diameter that is less than that of the recess 254, but greater than that of the central passage 248. As described below, this configuration allows the stopper 212 to prevent the rod piece 204 from entirely disengaging the base piece 204 upon final assembly.

Figure 12:
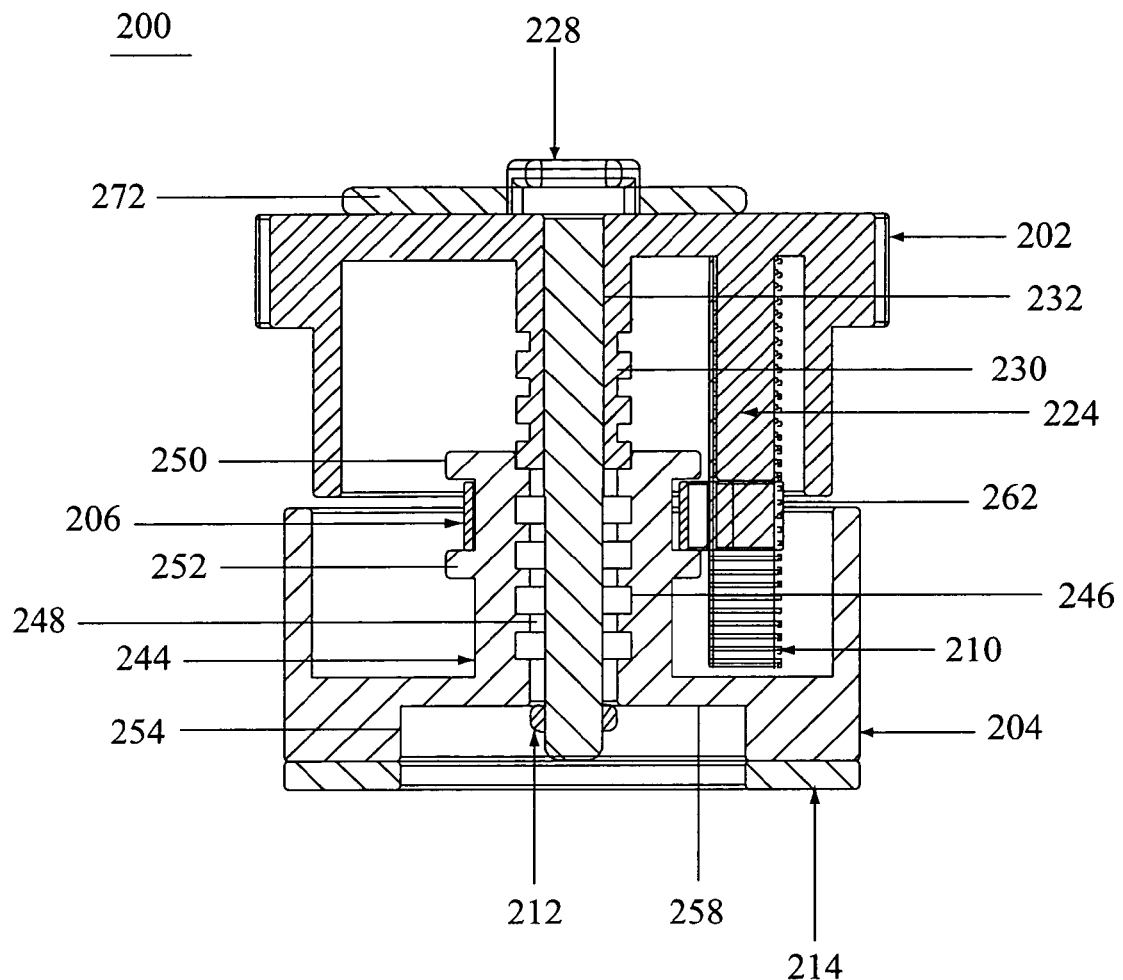
FIG. 12 is an enlarged, cross-sectional view of the device of FIG. 10 illustrating assembly thereof.

With reference to FIG. 12, assembly of the timer device 200 includes sliding the coil spring 210 on to the retention device 224 of the top piece 202. For purposes of clarity, FIG. 12 depicts the rod piece 208 assembled to the remaining components. In practice, however, it will be understood that the rod piece 208 (and the stopper 212) are preferably the last components assembled. As a further point of reference, the coil spring 210 is illustrated in an uncompressed state in FIG. 12. The spiral spring 206 is coaxially placed over the inner hub 244 of the base piece 204, nesting between the shelves 250, 252. For example, the spiral spring 206 can be unwound to an extent sufficient to pass the spiral 206 over the upper shelf 250, and then allowed to recoil onto itself. Alternatively, the upper shelf 250 can be removable from the inner hub 224 to facilitate placement of the spiral spring 206. Regardless, upon final assembly, the spiral spring 206 is restricted from vertical travel.

The spiral spring 206 is then unwound or otherwise extended relative to the inner hub 244. The top piece 202 is maneuvered toward the base piece 204 such that the leading end 262 of the spiral spring 206 is slid over the coil spring 210 otherwise secured to the retention device 224. Concurrently, the threads 230, 246 associated with the top piece 202 and the base piece 204 engage one another, such that the respective central passages 232, 248 are aligned. Once the threads are engaged, the top piece 202 is released, with the spiral spring 206 then winding the top piece 202 downwardly relative to the base piece 204 via the threads. In a preferred embodiment, a length of the retention device of shaft 224 corresponds with a height of the spiral spring 206 assembled to the inner hub 224, such that at least a portion of the retention device 224 extends within the leading 262 prior to releasing the top piece 202. With this construction, the torque generated by the spiral spring 206 is applied directly to the top piece 202 via the retention device 224. Alternatively, the coil spring 210 can be sufficiently radially rigid so that the retention device 224 need not initially extend within the leading end 262 of the spiral spring 206. With this technique, torque generated by the spiral spring 206 is transmitted to the retention device through the coil spring 210. In either case, the coil spring 210 is forced to compress and wind on itself as the spiral spring 206 winds.

Figure 13:
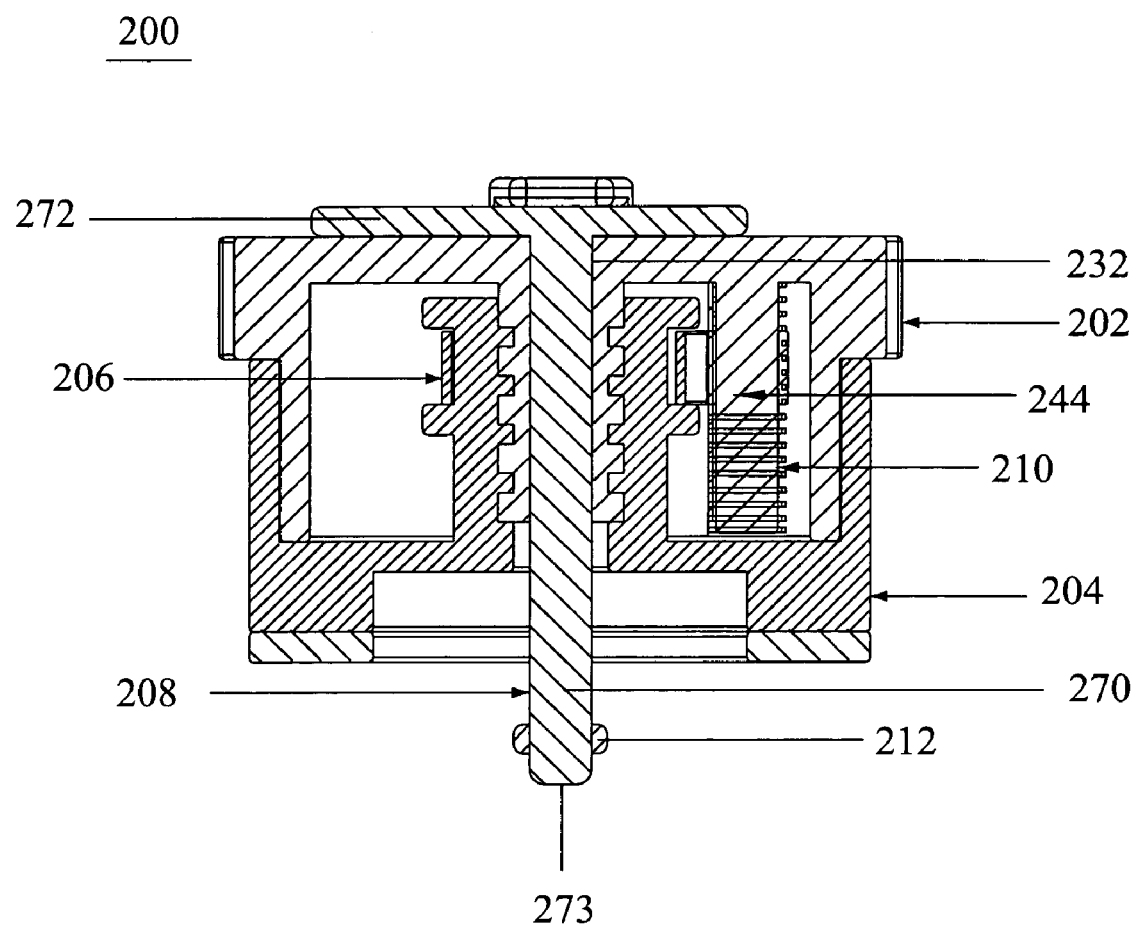
FIG. 13 is an enlarged, cross-sectional view of the device of FIG. 10 in a passive state.

Winding of the top piece 202 relative to the base piece 204 via the spiral spring 206 continues until the top piece 202 and the base piece 204 are nested against one another in a passive or minimal extension position. This relationship is best depicted in FIG. 13. The rod piece 208 is then assembled by placing the rod 270 within the passage 232 of the top piece 202. More particularly, the rod 270 slides through the passage 232, with the bottom end 273 extending outwardly from the base piece 204. The stopper 212 is then secured to the bottom end 273 of the rod 270.

Figure 14A:
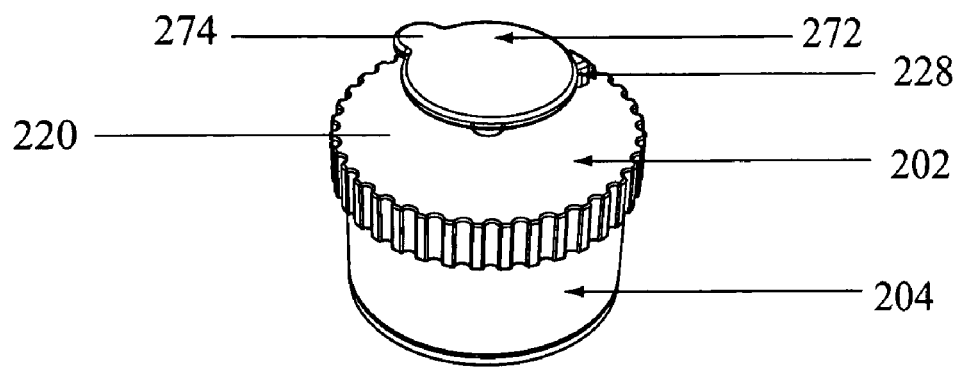
FIGS. 14A and 14B are perspective views of the device of FIG. 10 in a raised state.
Figure 14B:
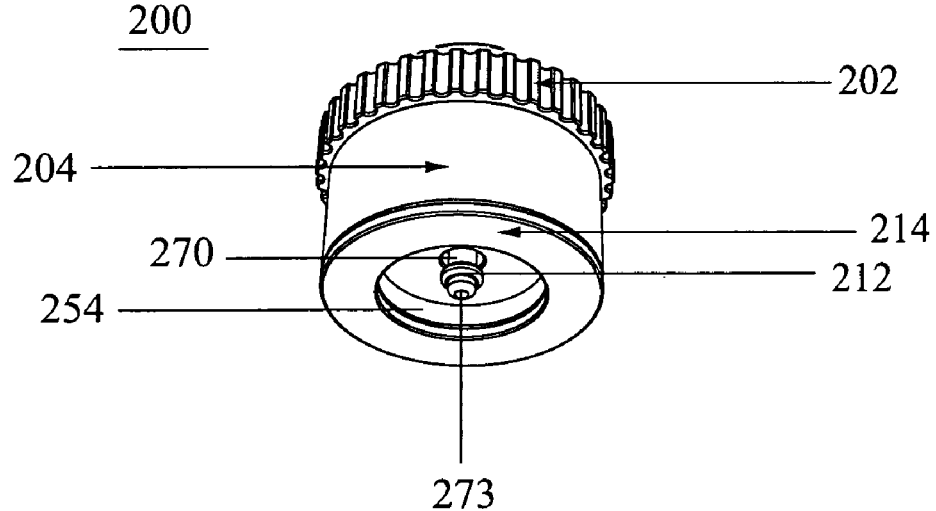

During use, the timer device 200 is assembled to a camera (not shown) as previously described. For example, the mounting device 214 can be utilized. During a manual operation, and as shown in FIGS. 14A and 14B, the cap 272 is placed in the "unlocked" position whereby the tongue 274 is away from the tab 228 of the top piece 202. Once again, the top piece 202 is in the minimal extension position relative to the base piece 204 such that the cap 272 projects above the head portion 220 of the top piece 202. In this position, the stopper 212 is maintained within the recess 254 of the base piece 204, contacting the engagement surface 258. The rod 270 is positioned directly above the shutter release button (not shown) of the camera. The user (not shown) then simply presses down on the cap 272, causing the rod 270, via the tip 273, to depress the shutter release button.

Conversely, hands-free or timed activation of the shutter release button (not shown) by the timer device 200 includes first rotating the cap 272 to the unlocked position as previously described. The user (not shown) then unscrews the top piece 202 relative to the base piece 204, extending the top piece 202 to the raised position. Once the maximum extension position is achieved, the cap 272 is rotated to the locked position, whereby the tongue 274 is engaged by the tab 228 via the crown 236 (FIG. 10). Effectively, then, the cap 272, and thus the rod 270, is coupled to the top piece 202. In this raised position, the coil spring 210 (FIG. 12) is in an uncompressed state. The top piece 202 is then released, and the spiral spring 206 rotates the top piece 202 downwardly relative to the base piece 204. The speed at which the top piece 202 moves relative to the base piece 204 is dictated by a configuration of the threads 230, 248, the spiral spring 206, and the coil spring 210, with the coil spring 210 serving as a drag on the release of energy from the spiral spring 206. In other words, rotation/winding of the spiral spring 206 causes the coil spring 210 to compress; this compression resists the winding torque of the spiral spring 206, thereby slowing transition of the timer device 200 from the raised or extended state of FIG. 12 to the relaxed or passive state of FIG. 13. During this winding operation, the rod 270 is directed downwardly to a point whereby the bottom end 273 of the rod 270 depresses the shutter release button of the camera. Following shutter release activation, the cap 272 is rotated to the unlocked position, thereby allowing the rod piece 208 to be retracted relative the top piece 202.

The timer device of the present invention provides a marked improvement over previous designs. Due to the minimal number of components, the timer device is highly inexpensive, and therefore useful with disposable cameras not otherwise incorporating a self-portrait feature. Further, because the timer device does not require a rigid frame, it is universally applicable to a wide variety of different camera designs.

Although the present invention has been described with reference to preferred embodiments, workers skilled in the art will recognize that changes can be made in form and detail without departing from the spirit and scope of the present invention. For example, the intermediate ring of the top piece can be sized to be received over the outer ring of the base piece. Even further, one or both of the intermediate ring and/or outer ring can be eliminated.

What is claimed is:

1. A timer mechanism for activating a shutter release button of a camera, the mechanism comprising:
   a bottom assembly including:
      a bottom housing,
      an inner hub extending axially within the bottom housing, the inner hub forming a central passage;
   a top assembly including:
      a top housing,
      a drive member extending axially within the top housing and aligned with the inner hub;
   a rod disposed within the central passage of the inner hub; and
   a spiral spring mechanically coupled to the drive member;
   wherein upon final assembly, the top housing is rotatable relative to the bottom housing to store energy in the spiral spring, the mechanism being configured to transfer the energy to the drive member such that the drive member forces the rod downwardly through the central passage for depressing a camera shutter release button during the downward movement.

2. The timer mechanism of claim 1, wherein the top assembly further includes a retention device extending axially between the top housing and the bottom housing, the retention device mechanically coupled to the drive member.

3. The timer mechanism of claim 2, wherein a portion of the retention device is a post.

4. The timer mechanism of claim 3, wherein the post is radially offset from a central axis of the top assembly.

5. The timer mechanism of claim 1, wherein a portion of the spiral spring is disposed in a location radially offset from a central axis of the bottom assembly.

6. The timer mechanism of claim 1, wherein the rod defines a top end and a bottom end, the top end extending to the top housing, the bottom end adapted to selectively depress a camera shutter release button.

7. The timer mechanism of claim 1, further comprising a coupling material provided at the bottom assembly for selectively securing the timer mechanism to a camera.

8. The timer mechanism of claim 1, further comprising a thread extending from opposite sides of the bottom assembly for selectively securing the timer mechanism to a camera.

9. The timer mechanism of claim 1, wherein the timer mechanism is configured to linearly move the rod during a shutter activation operation.

10. The timer mechanism of claim 1, wherein the spiral spring defines a central spiral spring axis, the central spiral spring axis being parallel to an axis of the rod.

11. A timer mechanism for activating a shutter release button of the camera, the timer mechanism comprising:
 a housing including a top assembly secured to a bottom assembly, at least the bottom assembly defining a central passage;
 a rod slidably maintained within the central passage, the rod defining a top end and a bottom end, the bottom end adapted to depress shutter release button of the camera; and
 a spiral spring mechanically coupled to a drive member of the top assembly;
 wherein winding of the spring stores energy, and selective release of the energy to the drive member causes a downward movement of the rod; and
 further wherein the rod is arranged to move axially such that the bottom end is extended from the housing for depressing a shutter release button of a camera.

12. A method of activating a shutter release button of a camera, the method comprising:
 providing a timer mechanism including a top assembly secured to a bottom assembly, a rod slidably maintained within a central passage of the bottom assembly, and a spiral spring mechanically coupled with the top assembly;
 connecting the timer mechanism to a camera such that a bottom end of the rod is over the shutter release button;
 rotating the top assembly relative to the bottom assembly such that energy is stored in the spiral spring;
 allowing the energy stored in the spiral spring to act upon a drive member of the top assembly such that the drive member causes the rod to move; and
 forcing the rod downwardly as the spiral spring acts upon the drive member;
 wherein the downward movement of the rod continues until the bottom end depresses the shutter release button.

13. The method of claim 12, wherein rotating the top assembly relative to the bottom assembly includes rotating a top housing of the top assembly relative to a bottom housing of the bottom assembly.

14. The method of claim 12, wherein rotating the top assembly relative to the bottom assembly includes transferring energy to a retention device extending between a top housing of the top assembly and a bottom housing of the bottom assembly.

15. The method of claim 12, wherein allowing the energy stored in the spiral spring to act upon a drive member of the top assembly includes transferring the energy stored in the spiral spring through a retention device extending into a top housing of the top assembly.

16. The method of claim 12, wherein allowing the energy stored in the spiral spring to act upon a drive member includes moving the drive member.

17. The method of claim 12, wherein allowing the energy stored in the spiral spring to act upon a drive member includes inducing a relative motion between an inner hub extending axially upwardly from the bottom assembly and the drive member.

18. The method of claim 12, wherein allowing the energy stored in the spiral spring to act upon a drive member includes inducing a relative motion between the bottom assembly and the drive member.

\* \* \* \* \*